(12) United States Patent
Danziger et al.

(10) Patent No.: US 6,327,403 B1
(45) Date of Patent: Dec. 4, 2001

(54) REDUCING MODE INTERFERENCE IN TRANSMISSION OF $LP_{02}$ MODE IN OPTICAL FIBERS

(75) Inventors: Yochay Danziger; Eran Herman, both of Rishon le Zion; Uri Levy, Rehovot; Michael Rosenblit, Ashdod, all of (IL)

(73) Assignee: LaserComm Inc., Plano, TX (US)

( * ) Notice: Subject to any disclaimer, the term of this patent is extended or adjusted under 35 U.S.C. 154(b) by 0 days.

(21) Appl. No.: 09/464,629

(22) Filed: Dec. 17, 1999

Related U.S. Application Data (60) Provisional application No. 60/138,369, filed on Jun. 10, 1999.

(51) Int. Cl.[7] .................................................. G02B 6/26
(52) U.S. Cl. .............................. 385/29; 385/28; 385/127; 385/126
(58) Field of Search .............................. 385/28, 29, 126, 385/127, 124, 123; 372/6

(56) References Cited

U.S. PATENT DOCUMENTS

| | | | |
|---|---|---|---|
| 4,372,648 | 2/1983 | Black | 350/96.33 |
| 4,447,124 | 5/1984 | Cohen | 350/96.3 |
| 4,723,828 | 2/1988 | Garel-Jones et al. | 350/96.15 |
| 5,121,460 | 6/1992 | Tumminelli et al. | 385/126 |
| 5,261,016 | 11/1993 | Poole | 385/28 |
| 5,790,735 | 8/1998 | Oleskevitch et al. | 385/127 |
| 5,818,630 | 10/1998 | Fermann et al. | 359/341 |
| 5,828,802 | 10/1998 | Stolen et al. | 385/27 |
| 5,841,926 | * 11/1998 | Takeuchi et al. | 385/123 |
| 5,926,600 | 7/1999 | Pavlath | 385/142 |

FOREIGN PATENT DOCUMENTS

| | | |
|---|---|---|
| 783 117 A2 | 7/1997 | (EP) . |
| 783 117 A3 | 3/2000 | (EP) . |
| 62275203 | 11/1987 | (JP) . |
| WO 99/54767 | 10/1999 | (WO) . |

* cited by examiner

*Primary Examiner*—Darren Schuberg
*Assistant Examiner*—Fayez Assaf
(74) *Attorney, Agent, or Firm*—Simon Mark Kahn (57) ABSTRACT

An optical waveguide supporting a plurality of modes including an absorbing annulus which attenuates a desired mode to a lesser degree than any other mode in the plurality of modes. In one embodiment, the absorbing annulus is disposed in the core of the waveguide. In another embodiment, the annulus is concentric about the core. In another embodiment, the annulus has a predetermined width and radius. In yet another embodiment the desired mode includes the $LP_{02}$ mode.

3 Claims, 8 Drawing Sheets

REDUCING MODE INTERFERENCE IN TRANSMISSION OF LP$_{02}$ MODE IN OPTICAL FIBERS

CROSS-REFERENCE TO RELATED APPLICATIONS

This application claims priority to provisional U.S. patent application No. 60/138,369 which was filed on Jun. 10, 1999.

FIELD OF THE INVENTION

The invention relates to optical fibers for use in communication systems and, more specifically, to devices which reduce mode interference in the fiber.

BACKGROUND OF THE INVENTION

Propagating a high order mode in optical fiber transmission systems can have advantages over propagating a fundamental or basic mode. For example, propagating a high order mode can improve the overall performance of transport systems. One way performance is improved is due to the choice of fiber that will support the propagation of the high order mode. A significant advantage of this high order mode fiber is that it can be designed to have strong negative dispersion and high effective areas. Therefore, it can be used to compensate for chromatic dispersion. The most favorable modes for this application in fiber optics are the even modes (LP$_{01}$, LP$_{02}$, LP$_{03}$ . . . ) because their properties are independent of polarization when being transmitted in a circularly symmetric fiber. There is a drawback to these high order mode fibers, however. Propagating a high order mode can generate interferometric noise due to mode coupling in the fiber. To substantially reduce this noise, it would be advantageous to propagate a single high order mode.

Various methods have been suggested for transforming or coupling light energy in the fiber from one mode to another different mode. For example, a long period fiber grating may be used to transfer energy from one mode to another mode. Unfortunately, this method can also transform some of the light energy from one mode to other undesirable modes. Other methods can have the same undesired results.

Energy transfer or coupling from the desired high order modes to undesirable modes can also occur due to inhomogeniety of the high order mode fiber. These inhomogenieties can occur in the manufacturing process. Inhomogenieties can also appear due to imperfect splicing of the fiber, periodic bending (micro bending), and scattering mechanisms (i.e., Riley scattering), for example.

The result of imperfect mode transformation and mode coupling in the fiber is that undesirable modes will propagate in the fiber. These modes can interfere with the desired mode through a process called multipath interference (MPI). MPI causes significant reduction in signal quality by distorting its phase and amplitude. Therefore, in order to realize reasonable signal quality, the ratio between the energy transmitted through the undesired modes to the energy transmitted through the desired mode should be below 1:10000 or approximately 40 dB. This ratio should be maintained for any length of high order mode fiber being used in order to maintain reasonable signal quality It is therefore desirable to suppress the undesired modes in a high order mode fiber in order to improve the signal quality in the fiber.

SUMMARY OF THE INVENTION

The invention relates to an optical waveguide for attenuating undesired modes. In one embodiment, the waveguide includes an absorbing annulus disposed substantially within a core of the waveguide. In another embodiment, the absorbing annulus is concentric about the core of the waveguide. In another embodiment, an optical fiber is used as a waveguide and the optical fiber supports the LP$_{02}$ mode. In still other embodiments, the width and the radius of the absorbing annulus are predetermined so as to attenuate undesired modes. Other embodiments include a plurality of absorbing annuli. In another embodiment, the absorbing annulus includes titanium. In still another embodiment, the absorbing annulus includes boron. In still another embodiment, the absorbing annulus includes Erbium. In still other embodiments, the absorbing annulus includes any suitably absorbing material. In other embodiments, the absorbing annulus includes scattering material.

In one embodiment, the desired mode is a high order mode. In another embodiment, the desired mode is an even high order mode. In yet another embodiment, the desired mode is the LP$_{02}$ mode.

In one embodiment of the invention, a method for attenuating undesired modes includes providing a multimode waveguide having a core, transmitting an optical signal having a plurality of modes through the waveguide, and absorbing the desired mode to a lesser degree than any other mode in the plurality of modes.

BRIEF DESCRIPTION OF THE DRAWINGS

This invention is pointed out with particularity in the appended claims. The above and further advantages of this invention may be better understood by referring to the following description taking in conjunction with the accompanying drawings, in which:

DETAILED DESCRIPTION

Figure 1:
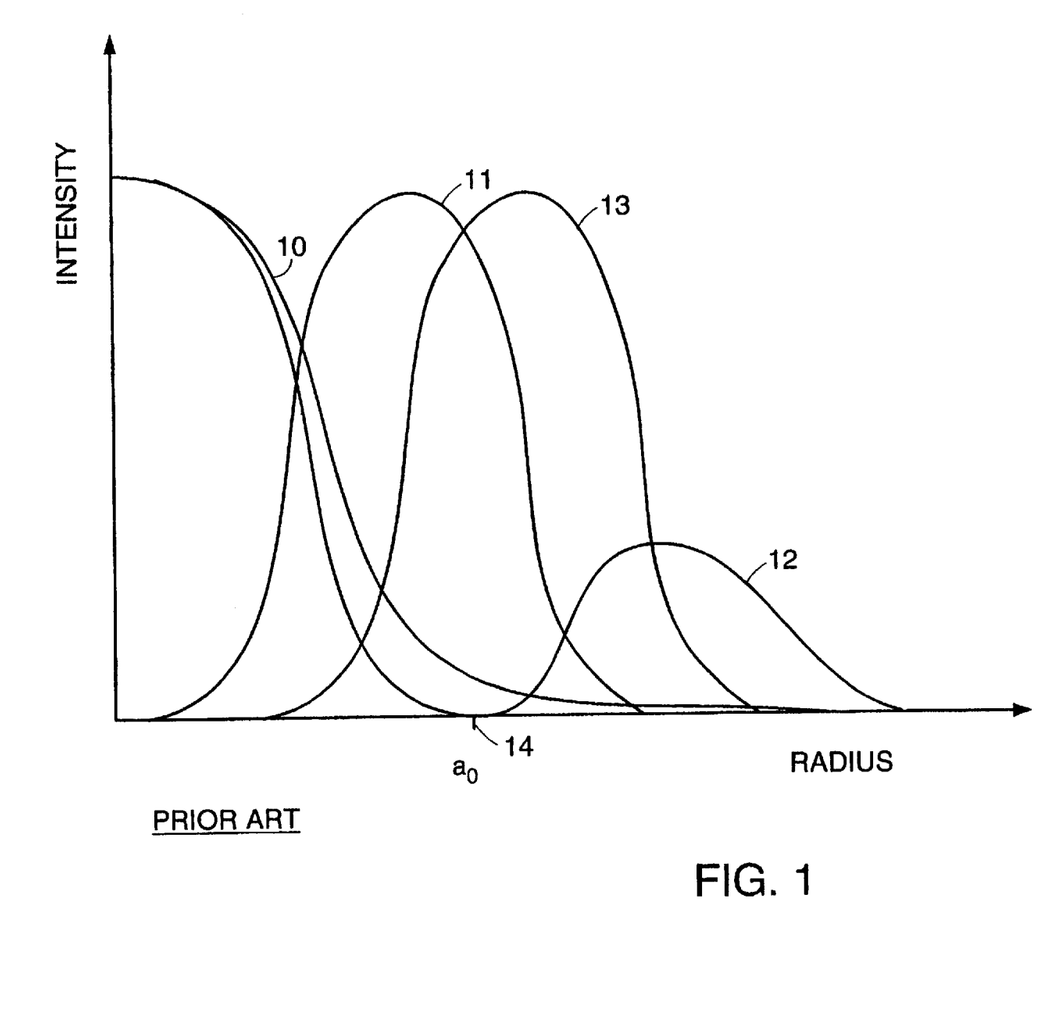
FIG. 1 illustrates the intensity distribution of the LP$_{01}$, LP$_{11}$, LP$_{02}$, and LP$_{21}$ modes in a conventional step index fiber known to the prior art.

Referring now to FIG. 1, therein is illustrated the intensity distribution of the LP$_{01}$ mode (10), LP$_{11}$ mode (11), LP$_{02}$ mode (12), and LP$_{21}$ mode (13) in a conventional step index fiber known to the prior art. The intensity of each mode varies with the radius of the fiber. For example, the LP$_{01}$ mode (10) has its maximum intensity close to the center of the fiber core and its intensity trails off to a minimum value as it gets deeper into the cladding of the fiber.

One realization of the present invention is that each of the modes $LP_{01}$, $LP_{11}$, $LP_{02}$, and $LP_{21}$, vary in intensity at different radii in the fiber core. Unwanted mode interference in the transmission of the $LP_{02}$ mode in an optical fiber can be reduced by reducing mode coupling or by selectively attenuating undesired modes. Please note that the terms "mode" and "spatial mode" are interchangeable throughout the application.

Selective attenuation can be achieved by changing the radial transmission profile of the optical fiber. Referring back to FIG. 1, the radial distribution of the intensity of the $LP_{02}$ mode (12) is shown. The $LP_{02}$ mode (12) has maximal intensity close to the center of the fiber core and no intensity at the radial distance $a_0$ 14. All other guided modes (10), (11), and (13) have significant energy at this radial distance $a_0$ 14.

Figure 2:
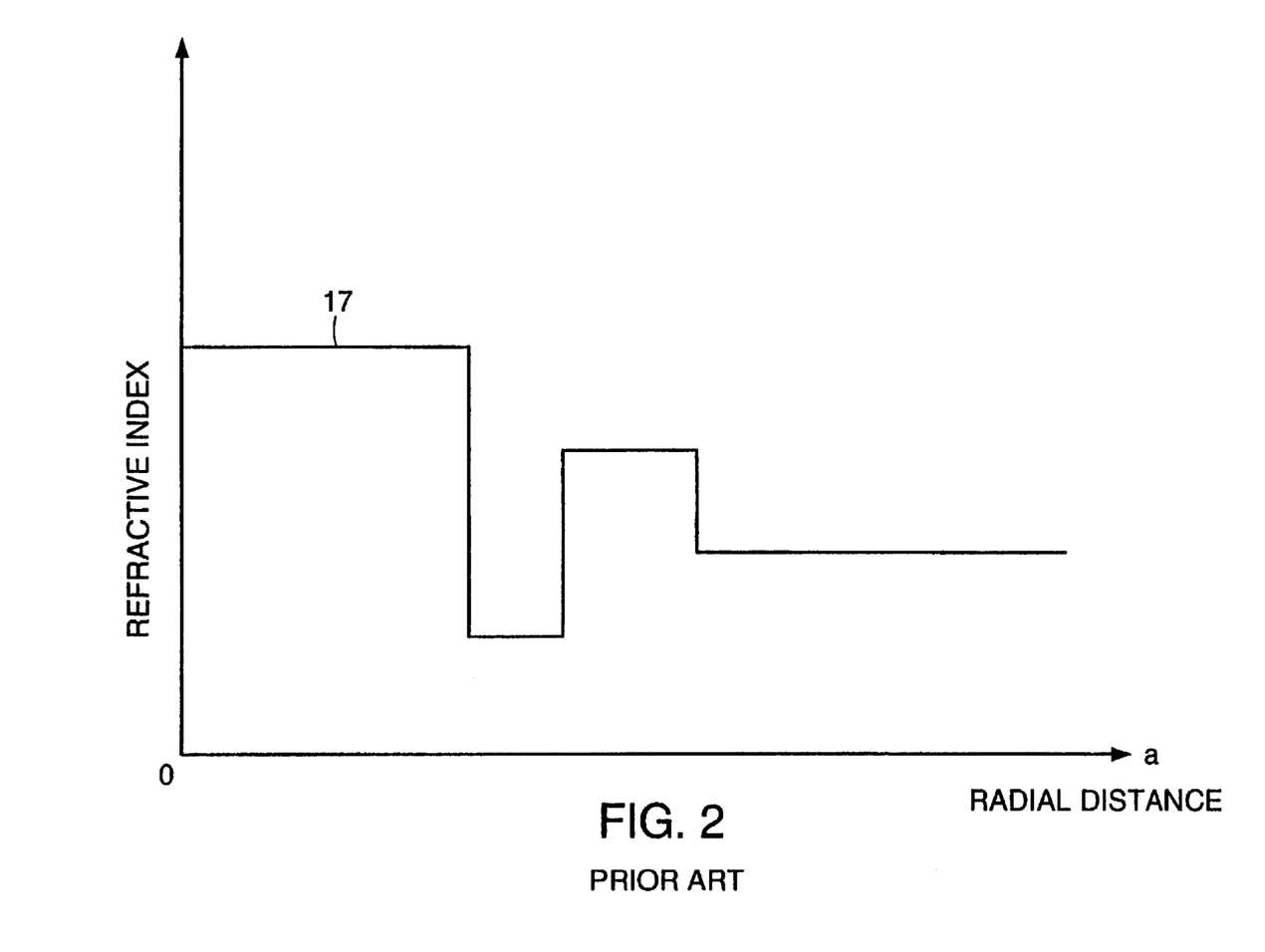
FIG. 2 shows an approximation of the variation in index of refraction with radial distance for a multiclad fiber approximated as a step profile known to the prior art.

FIG. 2 illustrates a rectangular approximation of the variation in index of refraction with radial distance for a fiber known to the prior art. This fiber has a profile 17 that can support both high and low order modes in the fiber.

Figure 3:
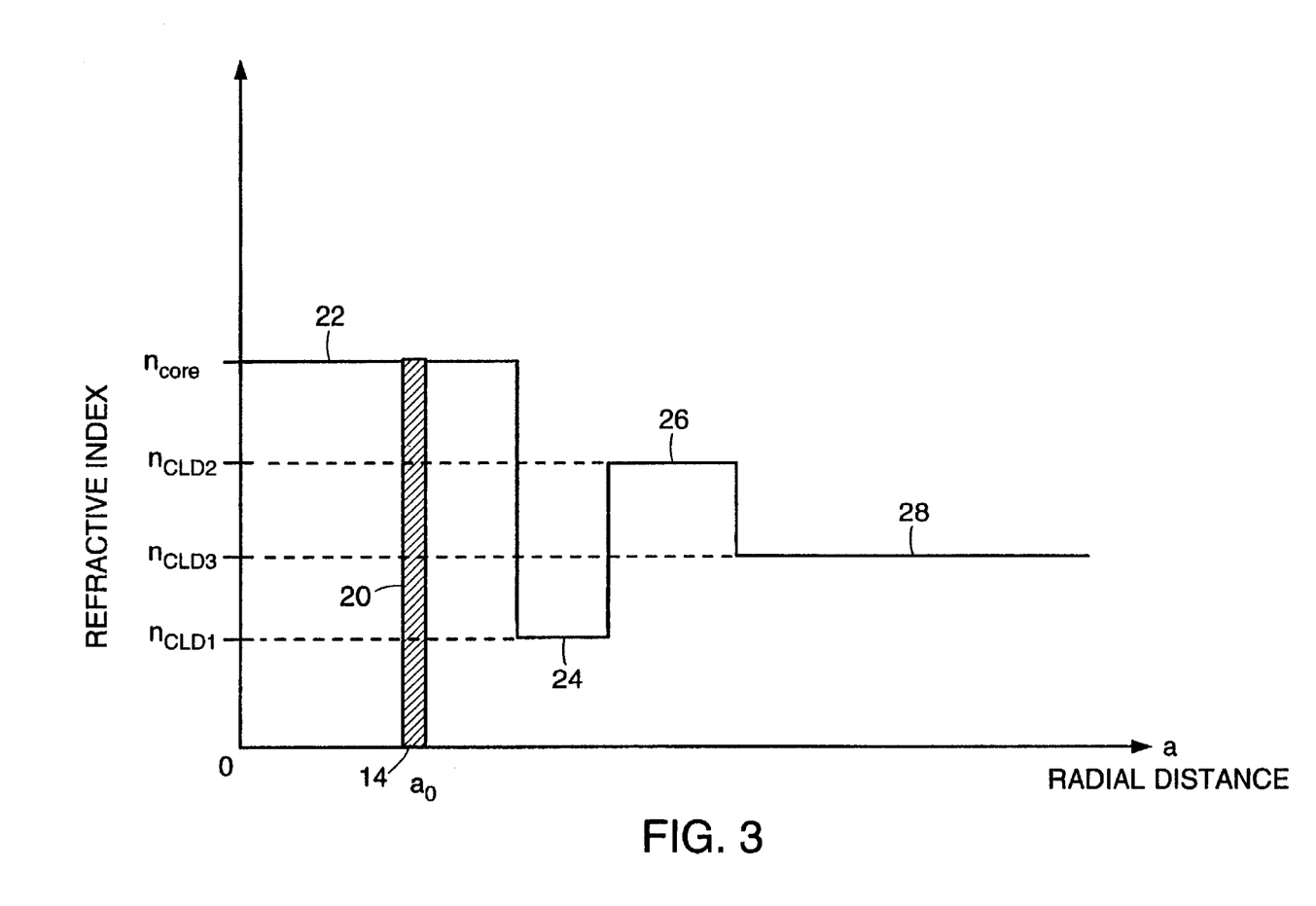
FIG. 3 shows an approximation of the variation in index of refraction with radial distance for one embodiment of an optical fiber including an absorbing annulus according to the present invention.

Referring now to FIG. 3, therein is shown an embodiment of the index profile of the present invention including an absorbing annulus 20. The absorbing annulus 20 in one embodiment is an absorbing ring introduced at the radial distance $a_0$ 14. In this embodiment, the index profile shows several index changes. The core 22 has an index $n_{core}$. The first cladding 24 has an index $n_{c1d1}$. The second cladding 26 steps up in index to $n_{c1d2}$ and the next cladding section 28 of the fiber has an index $n_{c1d3}$. The annulus 20 can be used to significantly attenuate all modes except the $LP_{02}$ mode (12). At radial distance $a_0$ 14 the $LP_{02}$ mode (12) has minimum intensity. Therefore, it will not be significantly attenuated by the absorbing annulus. Precise positioning of the absorbing annulus can be achieved through the use of conventional and specialized manufacturing methods known to those skilled in the art such as MCVD and OVD.

Figure 4:
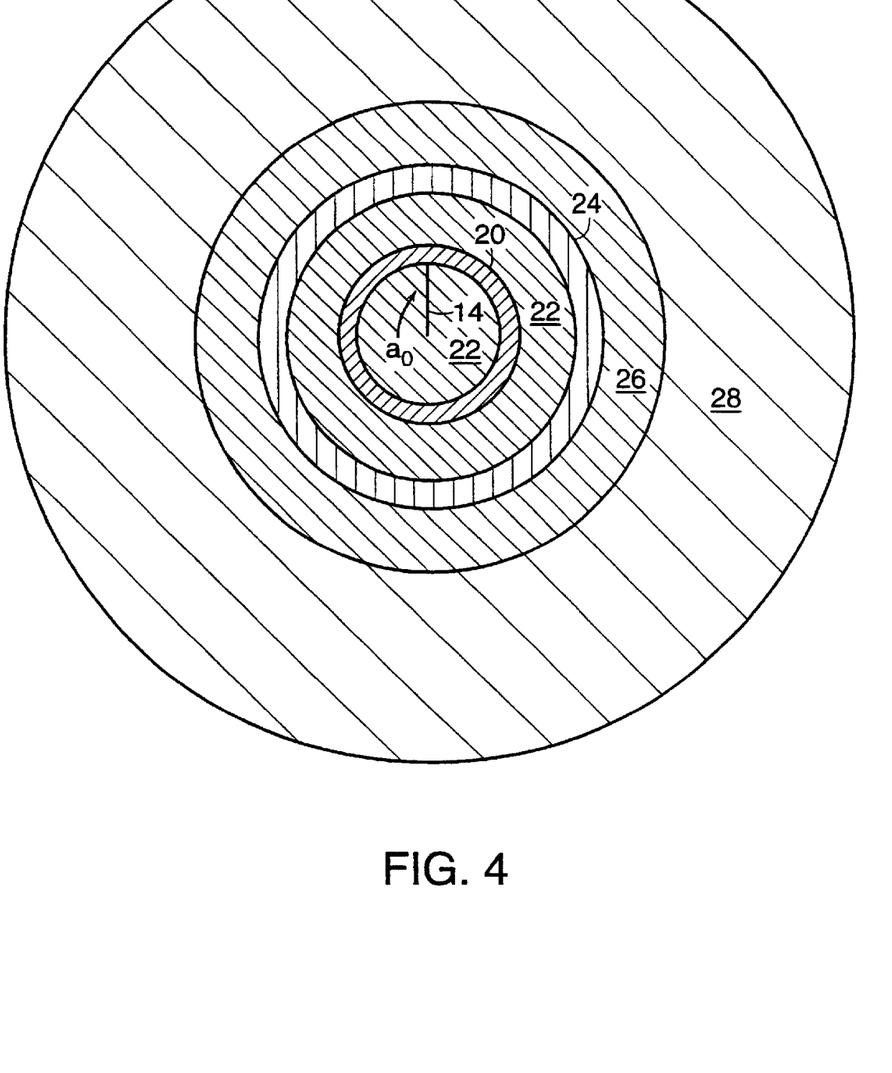
FIG. 4 is a cross-sectional view of one embodiment of an optical fiber constructed in accordance with the principles of the invention.

Referring to FIG. 4, therein is shown an embodiment of a waveguide according to the present invention. FIG. 4 shows a cross-sectional view of one embodiment of an optical fiber of the invention. Absorbing annulus 20 is positioned at a radial distance $a_0$ 14 from the center of the fiber. This corresponds to the location in which the $LP_{02}$ mode (12) has substantially zero intensity. Various index regions of this embodiment are shown including the region of core 22, the region of first cladding 24, the region of second cladding 26, and the region of the third cladding 28. This embodiment is only an example of one possible cross-section of a fiber according to the invention. It should be appreciated that other fiber profiles could be used within the scope of the invention. Furthermore, absorbing annulus 20 may vary in both width and radius, and may be located anywhere within the region defined by the core index 22. In addition, the absorbing annulus 20 may also surround the region of core index 22 (24, 26). In another embodiment, absorbing annulus 20 is designed to be thin so as not to substantially diverge from location $a_0$ 14 and, hence, unintentionally attenuate the desired mode. In yet another embodiment, multiple absorbing annuli may be used in the core and/or the cladding of the fiber. The absorbing annulus 20, in another embodiment, may be of any absorbing material, and may comprise titanium, boron, Erbium or any other absorbing material. Scattering materials can also be used as long as special care is made to reduce scattering from the desired mode to undesired modes. Below the desired threshold, this can be accomplished by reducing the scattering concentration or by using scattering at large angles.

Figure 5:
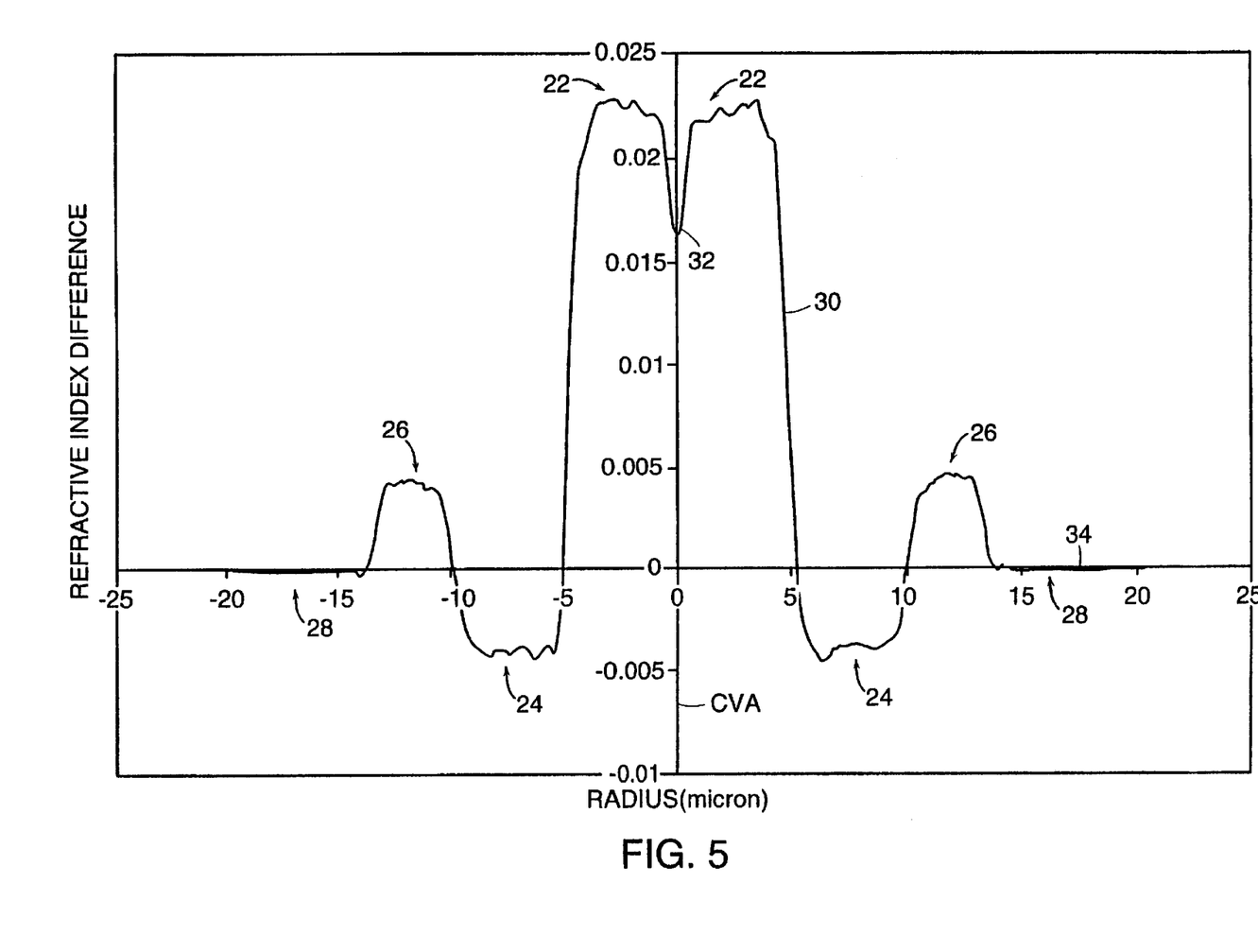
FIG. 5 shows the actual variation in index of refraction with radial distance according to one embodiment of the present invention.

FIG. 5 is a measurement of the actual variation in index of refraction with radial distance according to one embodiment of the present invention including an absorbing annulus 20. The actual index profile 30 is shown. The profile 30, is actually the index difference from the nominal index 34 of the cladding. The center vertical axis (CVA) in FIG. 5 corresponds to the center of the fiber. The dip 32 shown in the region of the core index 22 is a by-product of the manufacturing process. The region of the first cladding index 24, the region of the second cladding index 26, and the region of the next cladding index 28 are also shown.

Figure 6:
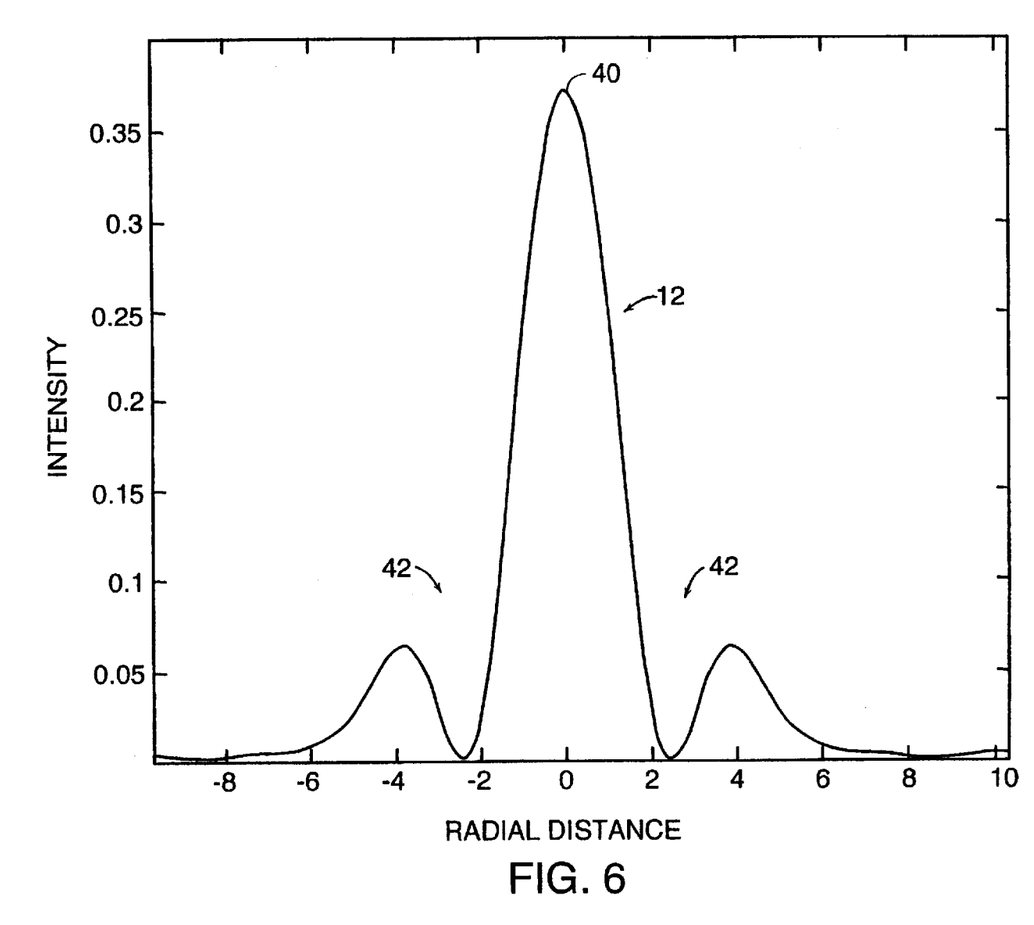
FIG. 6 shows the LP$_{02}$ mode distribution in an embodiment of a fiber according to the present invention.

FIG. 6 illustrates the $LP_{02}$ mode (12) distribution in an embodiment of the fiber presented in FIG. 5. In FIG. 6 the horizontal axis is the radial distance in microns and the vertical axis is the intensity in arbitrary units. In this embodiment, the $LP_{02}$ mode (12) has maximum intensity 40 at the center of the fiber and a null 42 in energy at a distance of approximately 2.25 microns from the center of the fiber.

Figure 7:
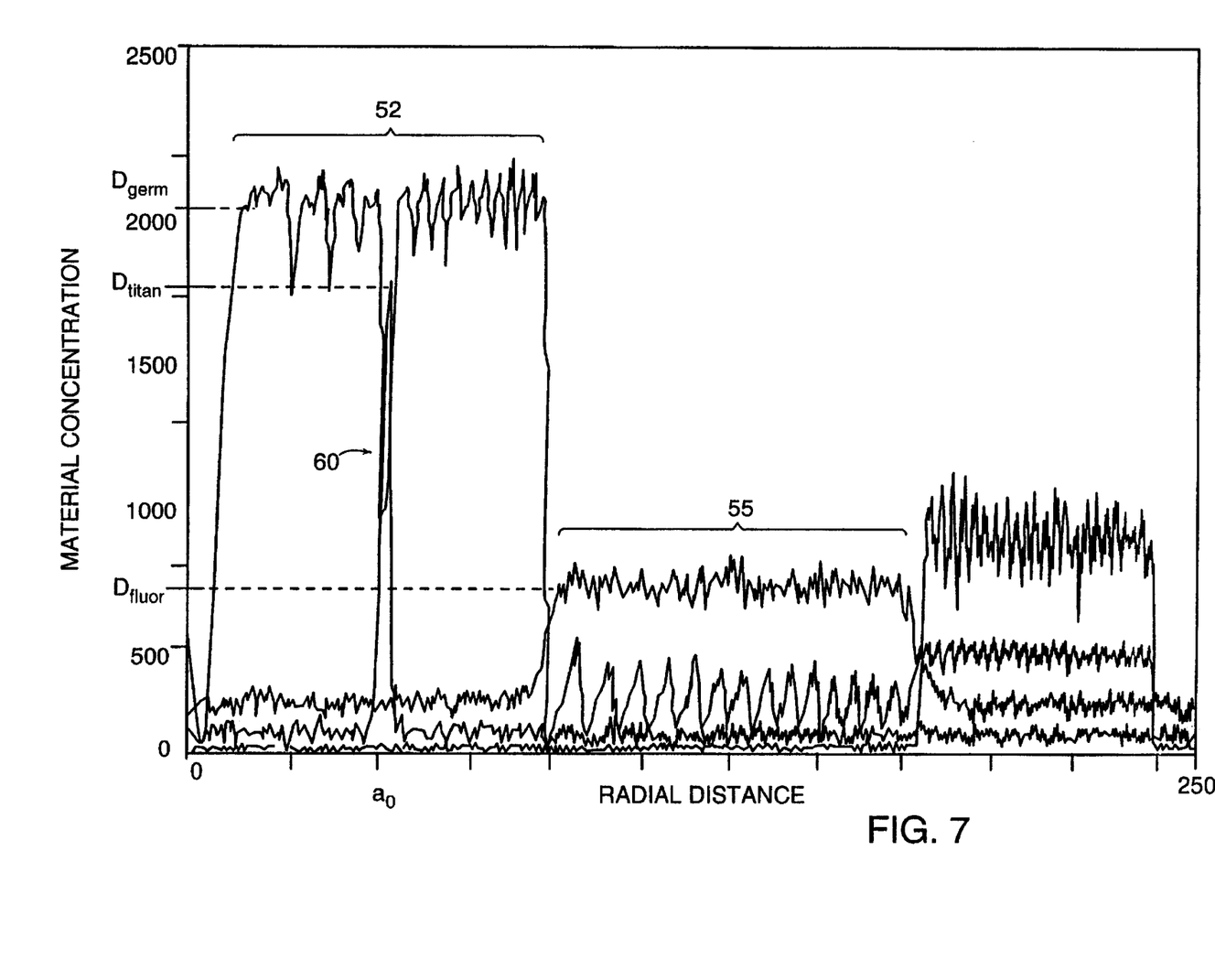
FIG. 7 illustrates actual measurements of various materials deposited in an embodiment of a fiber manufactured according to the present invention.

FIG. 7 illustrates the various materials deposited in the fiber as they were measured in the pre-form used to make an embodiment of this fiber. The horizontal axis represents radial distance where the left side of the diagram represents the center of the fiber and the right side is the cladding. The vertical axis represents material concentration in arbitrary units. The core 52 is doped with a germanium concentration $D_{germ}$ which increases the refractive index of the core of the fiber. The first cladding region 55 is doped with fluoride materials $D_{fluor}$ used to reduce refractive index. The absorbing annulus 60 comprises titanium $D_{titan}$ which was deposited in a ring in the core at radius $a_0$ in order to attenuate undesired modes. It can be seen in this diagram that, at the ring location $a_0$ where the titanium concentration $D_{titan}$ was high, the germanium concentration $D_{germ}$ was reduced in order to maintain a constant refractive index in the core region.

The absorbing material that comprises the absorbing annulus, in one embodiment, can be introduced into the optical fiber pre-form using conventional known technology. Preferably, the absorbing material has a low scattering coefficient. For example, titanium or boron can be used. Low scattering by the absorber material reduces energy coupling from the $LP_{02}$ mode into other modes. The width of the absorbing ring in one embodiment is preferably as narrow as possible in order to reduce losses to the $LP_{02}$ mode.

Figure 8:
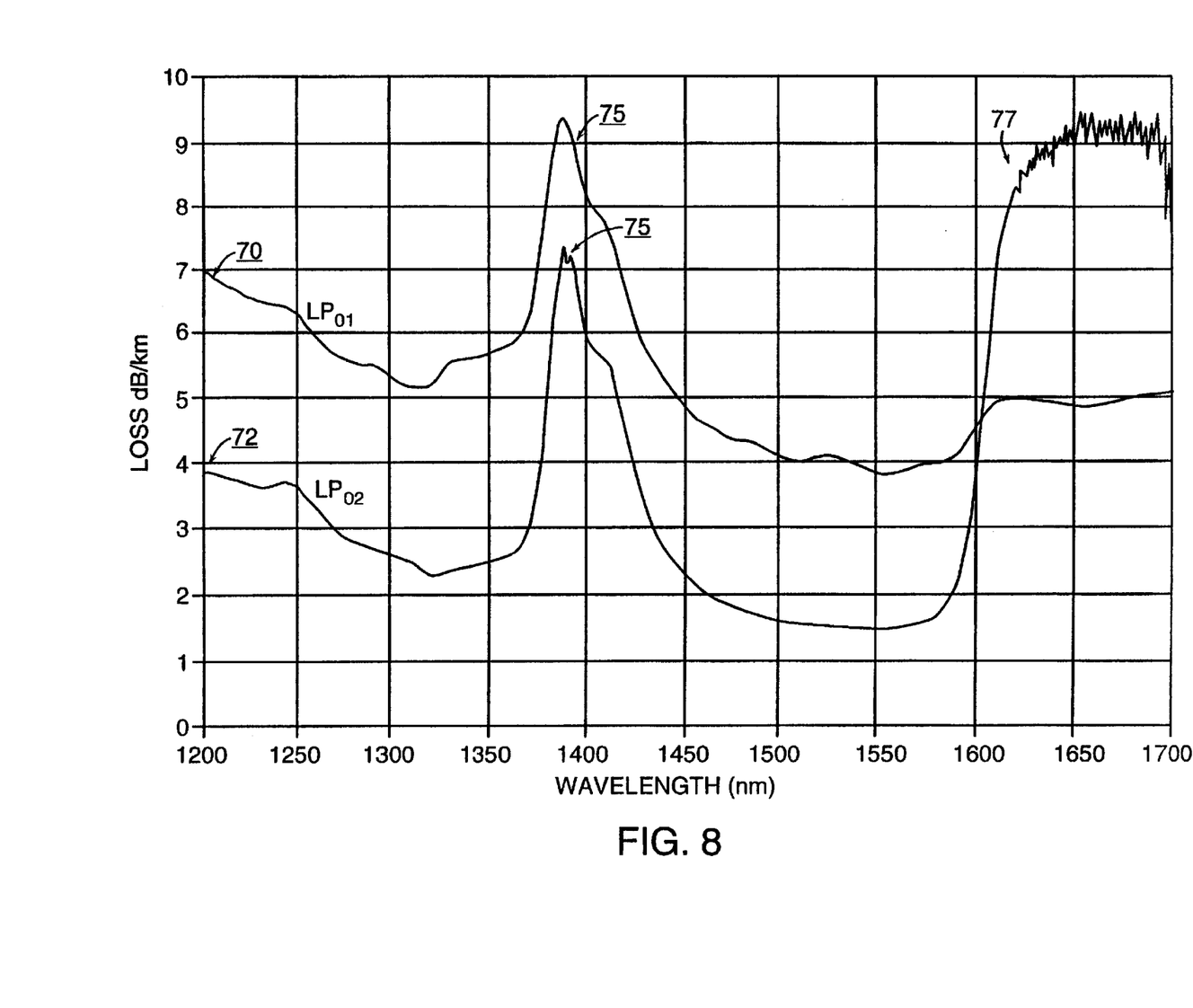
FIG. 8 shows an actual measurement of the attenuation of the LP$_{02}$ mode compared with the measured attenuation of the LP$_{01}$, mode for one embodiment of the present invention.

FIG. 8 is the measured attenuation of the $LP_{02}$ mode for one embodiment of the present invention. In FIG. 8, the horizontal axis represents the wavelength in nanometers, and the vertical axis represents the loss in dB per kilometer. The loss of the $LP_{01}$ mode with respect to wavelength is shown by line 70. The loss of the $LP_{02}$ mode with respect to wavelength is shown by line 72. There is significant increase of loss for these modes around 1400 nanometers (75) due to OH absorption in the fiber. There is another increase in loss for the $LP_{02}$ mode around 1600 nanometers due to cut off of this mode (77). However, in the typical operating wavelengths, between 1525 and 1565, the loss in the fiber of the LP02 mode is lower than in any other mode.

From these results, it is observed that the relative intensity of the $LP_{02}$ mode will remain constant or even improve as it propagates through the fiber. Therefore, the fiber is suitable for dispersion compensation applications. For example, the dispersion of an embodiment of this fiber was measured to be in the order of 250 psa/nm.km at 1550 nm.

The absorption coefficient for each mode with respect to the absorbing annulus can be calculated by overlapping the intensity distribution of the mode with the absorbing annulus. As an example of one embodiment, an absorbing annulus comprising boron having a width of 0.5 microns and located at a radial distance of 2.3 microns from the fiber center and having a local absorption of 30 dB/km increases the loss of the $LP_{02}$ mode by 0.1 1 dB/km. The undesired modes have a much higher loss:

$LP_{01}$ 5.26 dB/km more loss $LP_{11}$ 5 dB/km more loss $LP_{21}$ 5 dB/km more loss The calculation of the above values assumed a wavelength of 1550 nm. Changing the wavelength by ±50 nm caused low changes in losses of less than 0.001 dB/km.

It should be appreciated to those skilled in the art that the invention could be used to isolate any desired high even mode including the $LP_{02}$, $LP_{03}$ and $LP_{04}$ modes. It should also be appreciated that multiple absorbing annuli may be used without departing from the spirit or scope of the invention.

This fiber with the absorbing annulus can be applied in dispersion compensating fibers, transmission fibers or Erbium doped fiber amplifiers (EDFAs) using the $LP_{02}$ mode for example. The absorbing annulus can be applied to an optical fiber regardless of its refractive index profile.

Having described and shown the preferred embodiments of the invention, it will now become apparent to one of skill in the art that other embodiments incorporating the concepts may be used and that many variations are possible which will still be within the scope and spirit of the claimed invention. It is felt, therefore, that these embodiments should not be limited to disclosed embodiments but rather should be limited only by the spirit and scope of the following claims.

What is claimed is:

1. An optical waveguide comprising:

a) a multimode waveguide having a core and supporting a plurality of modes; and b) an absorbing annulus disposed in the core, wherein the absorbing annulus attenuates the $LP_{02}$ mode to a lesser degree than any other mode in the plurality of modes.

2. A method for attenuating undesired modes comprising:

a) providing a multimode waveguide having a core;

b) transmitting an optical signal through the waveguide, the optical signal having a plurality of modes; and c) absorbing the plurality of modes in a predetermined region within the core, wherein the $LP_{02}$ mode is absorbed to a lesser degree than any other mode in the plurality of modes.

3. A method for attenuating undesired modes comprising:

a) providing a multimode waveguide having a core;

b) transmitting an optical signal through the waveguide, the optical signal having a plurality of modes; and c) absorbing the plurality of modes in a predetermined region comprising an absorbing annulus within the core, wherein the $LP_{02}$ mode is not substantially absorbed by the absorbing annulus.

* * * * *